US006313954B1

(12) United States Patent
Tai

(10) Patent No.: US 6,313,954 B1
(45) Date of Patent: Nov. 6, 2001

(54) CORRECTIVE LENS FOR COPYING BOOKS

(76) Inventor: Charles C. Tai, 4295 Fuller Hollow Rd., Vestal, NY (US) 13850

( * ) Notice: Subject to any disclaimer, the term of this patent is extended or adjusted under 35 U.S.C. 154(b) by 0 days.

(21) Appl. No.: 09/513,898

(22) Filed: Feb. 28, 2000

(51) Int. Cl.[7] .......................... G02B 13/08; G02B 27/32; G02B 27/68; G02B 15/00
(52) U.S. Cl. .............................. 359/668; 355/25; 355/52; 399/118
(58) Field of Search .................... 359/668, 670, 359/804, 806, 807, 809, 810; 355/25, 52; 399/118, 362

(56) References Cited

U.S. PATENT DOCUMENTS

| 3,609,030 | 9/1971 | Sugarman et al. ............ 399/246 |
| 3,635,557 | * 1/1972 | Alderton ........................ 355/65 |
| 4,585,334 | 4/1986 | Malyon ......................... 355/25 |
| 4,763,173 | 8/1988 | Harrigan et al. ............... 355/52 |
| 5,072,252 | * 12/1991 | Howseman, Jr. ............... 355/1 |

FOREIGN PATENT DOCUMENTS

| 55052073-A | * 4/1980 | (JP) ......................... 355/75 |
| 60186830-A | * 9/1985 | (JP) ......................... 355/1 |
| 63254437-A | * 10/1988 | (JP) ......................... 355/75 |

* cited by examiner

*Primary Examiner*—Georgia Epps
*Assistant Examiner*—David N. Spector
(74) *Attorney, Agent, or Firm*—Salzman & Levy

(57) ABSTRACT

A corrective lens for copying pages of a book pressed flat upon a document support glass of a xerographic copying machine or document scanner. The corrective lens is shaped to fit in the space between the book pages to be copied and the document glass of the copier. The corrective lens has a pyramidal center extending into the crease of a typical book. The lens extends outwardly from the pyramidal center to form substantially flat side portions that hold the pages of the open book in place.

26 Claims, 8 Drawing Sheets

SUMMA THEOLOGICA not will, because it is fitting to Him not to will them, as stated above (Part. I-II, Q. xix, A. 10), when we were treating of the goodness of the will.

*Reply Obj.* 3. Charity elicits the act of love not only as regards the object, but also as regards the lover, as stated above. The result is that the man who is more nearly united to us is more loved.

ARTICLE 8. *Whether We Ought To Love More Those Who Are Connected with Us by Ties of Blood?*

*We proceed thus to the Eighth Article:* It would seem that we ought not to love more those who are more closely united to us by ties of blood.

*Objection* 1. For it is written (Prov. 18, 24): *A man amiable in society, shall be more friendly than a brother.* Again, Valerius Maximus says (*Fact. et Dict. Memor. iv, 7*):¹ "The ties of friendship are most strong and in no way yield to the ties of blood. Moreover it is quite certain and undeniable, that as to the latter, the lot of birth is fortuitous, whereas we contract the former by an untrammelled will, and a solid pledge." Therefore we ought not to love more than others those who are united to us by ties of blood.

*Obj.* 2. Further, Ambrose says (*De Officiis*, i, 7):² "I love not less you whom I have begotten in the Gospel, than if I had begotten you in wedlock, for nature is no more eager to love than grace. Surely we ought to love those whom we expect to be with us for ever more than those who will be with us only in this world." Therefore we should not love our kindred more than those who are otherwise connected with us.

*Obj.* 3. Further, "Love is proved by deeds," as Gregory states (*Hom. in Ev.* xxx).³ Now we are bound to do acts of love to others than our kindred; thus in the army a man must obey his officer rather than his father. Therefore we are not bound to love our kindred most of all.

*On the contrary,* The commandments of the decalogue contain a special precept about the honour due to our parents (Exod. 20, 12). Therefore we ought to love more specially those who are united to us by ties of blood.

*I answer that,* As stated above (A. 7), we ought out of charity to love those who are more closely united to us more, both because our love for them is more intense, and because there are more reasons for loving them. Now intensity of love arises from the union of lover and beloved,

¹ DD 664.  ² PL 16, 34.  ³ PL 76, 1220.

PART II OF SECOND PART Q. 26, ART. 10 and therefore we should measure the love of different persons according to the different kinds of union, so that a man is more loved in matters touching that particular union in respect of which he is loved. And, again, in comparing love to love we should compare one union with another.

Accordingly we must say that friendship among blood relations is based upon their connection by natural origin, the friendship of fellow-citizens on their civic fellowship, and the friendship of those who are fighting side by side on the comradeship of battle. Therefore in matters pertaining to nature we should love our kindred most, in matters concerning relations between citizens, we should prefer our fellow-citizens, and on the battlefield our fellow-soldiers. Hence the Philosopher says⁴ that "it is our duty to render to each class of people such respect as is natural and appropriate. This is in fact the principle upon which we seem to act, for we invite our relations to a wedding... It would seem to be a special duty to afford parents the means of living... and to honour them." And the same applies to other kindly friendship.

If however we compare union with union, it is evident that the union arising from natural origin is prior to, and more stable than, others, because it is something affecting the very substance, while other unions are something added above and may cease altogether. Therefore the friendship of kindred is more stable, while other friendships may be stronger in respect of that which is proper to each of them.

*Reply Obj.* 1. Because the friendship of comrades originates through their own choice, in matters of this kind takes precedence of the love of kindred in matters where we are free to do as we choose, for instance in matters of action. Yet the friendship of kindred is more stable, since it is more natural, and preponderates over others in matters touching nature. Consequently we are more bound to them in the providing of necessaries.

*Reply Obj.* 2. Ambrose is speaking of love with regard to favours respecting the fellowship of grace, namely, moral instruction. For in this matter, a man ought to provide for his spiritual children whom he has begotten spiritually, more than for the sons of his body, whom he is bound to support in bodily sustenance.

*Reply Obj.* 3. The fact that in the battle a man obeys his officer rather than his father, proves that he loves his father less, not absolutely, but relatively, that is, as regards the love which is based on fellowship in battle.

ARTICLE 9. *Whether a Man Ought, out of Charity, To Love His Children More than His Father?*

*We proceed thus to the Ninth Article:* It would seem that a man ought, out of charity, to love his children more than his father.

*Objection* 1. For we ought to love those more whom we are bound to do good. Now we are bound to do good to our children than to our parents, since the Apostle says (II Cor. 12, *Neither ought the children to lay up for the parents, but the parents for the children.* Therefore a man ought to love his children more than his parents.

*Obj.* 2. Further, Grace perfects nature. But naturally love their children more than their parents, as the Philosopher states.⁵ Therefore a man ought to love his children more than his parents.

*Obj.* 3. Further, Man's affections are concentrated to God by charity. But God loves His children more than they love Him. Therefore also ought to love our children more than parents.

*On the contrary,* Ambrose says⁶ that we ought to love God first, then our parents, then our children, and lastly those of our household.

*I answer that,* As stated above (A. 4, Reply 1, 3), the degrees of love may be thought of from two standpoints. First, from that of the object. In this respect the more a thing has the aspect of good, and the more like to God, the more it is to be loved. And in this way a man ought to love his father more than his children, because, namely, he loves his father as his principle, in which respect he is a more exalted good and more like God.

Secondly, the degrees of love may be measured from the standpoint of the lover, and in this way a man loves more that which is closely connected with him. In this way a man's children are more lovable to him than his father, as the Philosopher states.⁷ First, because parents love their children as being part of themselves; but the father is not part of his son, so that the love of a father for his children, is like a man's love for himself. Secondly, because parents know better that so and so is their child than vice versa. Thirdly, because children are nearer to their parents, as being part of them than their parents are to them to ⁴ *Ethic.*, ix, 2 (1165ᵃ17).

517 whom they stand in the relation of a principle. Fourthly, because parents have loved longer, for the father begins to love his child at once, while the child begins to love his father after a lapse of time; and the longer love lasts, the stronger it is, according to Ecclus. 9, 14: *Forsake not an old friend, for the new will not be like to him.*

*Reply Obj.* 1. The debt due to a principle is submission of respect and honour, while that due to the effect proportionately on the part of the principle is one of influence and care. Hence the duty of children to their parents consists chiefly in honour, while that of parents to their children is especially one of care.

*Reply Obj.* 2. It is natural for a man as father to love his children more, if we consider them as closely connected with him; but if we consider which is the more exalted good, the son naturally loves his father more.

*Reply Obj.* 3. As Augustine says,⁸ "God loves us for our good and for His honour." Therefore since our father is related to us as principle, even as God is, it belongs properly to the father to receive honour from his children, and to the children to be provided by their parents with what is good for them. Nevertheless in cases of necessity the child is bound out of the favours received to provide for his parents before all.

ARTICLE 10. *Whether a Man Ought To Love His Mother More Than His Father?*

*We proceed thus to the Tenth Article:* It would seem that a man ought to love his mother more than his father.

*Objection* 1. For, as the Philosopher says,⁹ "the female produces the body in generation." Now man receives his soul, not from his father, but from God by creation, as stated in the First Part (Q. xc, A. 2; Q. cxviii, A. 2). Therefore a man receives more from his mother than from his father, and consequently he ought to love her more than him.

*Obj.* 2. Further, Where greater love is given, greater love is due. Now a mother loves her child more than the father does, for the Philosopher says⁴ that "mothers have greater love for their children. For the mother labours more in child-bearing, and she knows more surely than the father who are her children." Therefore a man ought to love his mother more than his father.

*Obj.* 3. Further, Love should be more fond towards those who have laboured for us more, ⁴ *Christian Doctrine,* I, 32 (PL 34, 32).  ⁵ *Generation of Animals,* I, 20 (729ᵃ10); II, 4 (738ᵇ3).  ⁶ *Ethics,* IX, 7 (1168ᵃ25).

Figure 7

526 SUMMA THEOLOGICA ing our neighbour out of charity, as stated above (Q. XXV., A. 1). When therefore it is asked which is better or more meritorious, to love one's friend or one's enemy, these two loves may be compared in two ways: first, on the part of our neighbour whom we love, secondly, on the part of the reason for which we love him.

In the first way, love of one's friend surpasses love of one's enemy, because a friend is both better and more closely united to us, so that he is a more suitable matter of love, and consequently the act of love pervading this matter is better, and therefore its opposite is worse, for it is worse to hate a friend than an enemy.

In the second way, however, it is better to love one's enemy than one's friend, and this for two reasons. First, because it is possible to love one's friend for another reason than God, whereas God is the only reason for loving one's enemy. Secondly, because if we suppose that both are loved for God, our love for God is proved to be all the stronger through carrying a man's affections to things which are furthest from him, that is, even to the love of his enemies, just as the power of a fire is proved to be the stronger according as it throws its heat to more distant objects. Hence our love for God is proved to be so much the stronger, as the things we accomplish for its sake are the more difficult, just as the power of fire is so much the stronger, as it is able to set fire to a less inflammable matter.

Yet just as the same fire acts with greater force on what is near than on what is distant, so too, charity loves with greater fervour those who are united to us than those who are far removed; and in this respect the love of friends, considered in itself, is more ardent and better than the love of one's enemy.

*Reply Obj. 1.* The words of Our Lord must be taken in their strict sense, because the love of one's friends is not meritorious in God's sight when we love them merely because they are our friends; and this would seem to be the case when we love our friends in such a way that we love not our enemies. On the other hand the love of our friends is meritorious if we love them for God's sake, and not merely because they are our friends.

The *Reply to the other objections* is evident from what has been said in the article, because the two arguments that follow consider the reason for loving, while the last considers the question on the part of those who are loved.

PART II OF SECOND PART Q. 28. ART. 1

ARTICLE 8. *Whether It Is More Meritorious To Love One's Neighbour Than to Love God?*

*We proceed thus to the Eighth Article.*: It would seem that it is more meritorious to love one's neighbour than to love God.

*Objection* 1. For the more meritorious thing would seem to be what the Apostle preferred. Now the Apostle preferred the love of our neighbour to the love of God, according to Rom. 9, 3: *I wished myself to be an anathema from Christ, for my brethren*. Therefore it is more meritorious to love one's neighbour than to love God.

*Obj.* 2. Further, In a certain sense it seems to be less meritorious to love one's friend, as stated above (A. 7). Now God is our chief friend, since *He hath first loved us* (I John 4. 10). Therefore it seems less meritorious to love God.

*Obj.* 3. Further, Whatever is more difficult seems to be more virtuous and meritorious, since virtue is about that which is difficult and good. Now it is easier to love God than to love one's neighbour, both because all things love God naturally, and because there is nothing unlovable in God, and this cannot be said of one's neighbour. Therefore it is more meritorious to love one's neighbour than to love God.

*On the contrary*, That on account of which a thing is such, is yet more so. Now the love of one's neighbour is not meritorious except by reason of his being loved for God's sake. Therefore the love of God is more meritorious than the love of our neighbour.

*I answer that*, This comparison may be taken in two ways. First, by considering both loves separately; and then, without doubt, the love of God is the more meritorious, because a reward is due to it for its own sake, since the ultimate reward is the enjoyment of God, to Whom the movement of the love of God tends. Hence a reward is promised to him that loves God (John 14. 21): *He that loveth Me, shall be loved of My Father, and I will ... manifest Myself to him.* Secondly, the comparison may be understood to be between the love of God alone on the one side, and the love of one's neighbour for God's sake, on the other. In this way love of our neighbour includes love of God, while love of God does not include love of our neighbour. Hence the comparison will be between perfect love of God, extending also to our neighbour, and inadequate and imperfect love of God, for *this commandment we have from God, that he, who loveth God, love also his brother* (I John 4. 21).

*Reply Obj.* 1. According to one gloss, the Apostle did not desire this, that is, to be severed from Christ for his brethren, when he was in a state of grace, but had formerly desired it when he was in a state of unbelief, so that we should not imitate him in this respect.

We may also reply, with Chrysostom (*De Compunct.* 1), that this does not prove the Apostle to have loved his neighbour more than God, but that he loved God more than himself. For he wished to be deprived for a time of the Divine enjoyment which pertains to love of oneself in order that God might be honoured in his neighbour, which pertains to the love of God.

*Reply Obj.* 2. A man's love for his friends is sometimes less meritorious in so far as he loves them for their own sake, so as to fall short of the true reason for the friendship of charity, which is God. Hence that God be loved for His own sake does not diminish the merit, but is the entire reason for merit.

*Reply Obj.* 3. The "good" has, more than the "difficult," to do with the reason of merit and virtue. Therefore it does not follow that whatever is more difficult is more meritorious, but only what is more difficult and at the same time better.

QUESTION XXVIII

OF JOY (In Four Articles)

We must now consider the effects which result from the principal act of charity which is love, and (1) the interior effects, (2) the exterior effects (Q. XXXI). As to the first, three things have to be considered: (1) Joy, (2) Peace (Q. XXIX), (3) Mercy (Q. XXX).

Under the first head there are four points of inquiry, (1) Whether joy is an effect of charity? (2) Whether this kind of joy is compatible with sorrow (3) Whether this joy can be full? (4) Whether it is a virtue?

ARTICLE 1. *Whether Joy Is an Effect in Us by Charity?*

*We proceed thus to the First Article.*: It would seem that joy is not an effect in us of charity.

*Objection* 1. For the absence of what we love causes sorrow rather than joy. But God, Whom we love by charity, is absent from us, so long as we are in this state of life, since *while we are in the body, we are absent from the Lord* (II Cor. 5. 6). Therefore charity causes sorrow in us rather than joy.

*Obj.* 2. Further, It is chiefly through charity that we merit happiness. Now mourning, which pertains to sorrow, is put among those things by which we merit happiness, according to Matt. 5. 5: *Blessed are they that mourn, for they shall be comforted*. Therefore sorrow, rather than joy, is an effect of charity.

*Obj.* 3. Further, Charity is a virtue distinct from hope, as shown above (Q. XVII., A. 6). Now joy is caused by hope, according to Rom. 12. 12: *Rejoicing in hope*. Therefore it is not caused by charity.

*On the contrary*, It is written (Rom. 5. 5): *The charity of God is poured forth in our hearts by the Holy Ghost, Who is given to us.* But joy is caused in us by the Holy Ghost according to Rom. 14. 17: *The kingdom of God is not meat and drink, but justice and peace, and joy in the Holy Ghost.* Therefore charity is a cause of joy.

*I answer that*, As stated above (Part I-II, Q. XXV, A. 3; Q. XXVI, A. 1, reply 2), when we love a thing, a twofold movement of the passions, joy and sorrow arises from love, according as the loved object is present or absent. On the other hand sorrow arises from love either through the absence of the thing loved, or because the loved object to which we wish well is deprived of its good or afflicted with some evil. Now charity is love of God, Whose good is unchangeable, since He is His goodness; and from the very fact that He is loved, He is in those who love Him by His most excellent effect, according to I John 4. 16: *He that abideth in charity, abideth in God, and God in him.* Therefore spiritual joy, which is about God, is caused by charity.

*Reply Obj.* 1. So long as we are in the body, we are said to be *absent from the Lord*, in comparison with that presence by which He is present to some by the vision of sight; hence the Apostle goes on to say (*ibid.*): *For we walk by faith and not by sight.* Nevertheless, even in this life, He is present to those who love Him, by the indwelling of His grace.

CORRECTIVE LENS FOR COPYING BOOKS

FIELD OF INVENTION

The present invention relates to copying methods and apparatuses and, more particularly, to a method and apparatus for correcting for the distortion that results when copying pages of a book pressed against the document support glass of a copying machine or a document scanner.

BACKGROUND OF THE INVENTION

Ever since the introduction of xerographic photocopiers, many have experienced the difficulty in producing clear, non-distorted copies from opened books or volumes that have been pressed upon the flat document glass. This difficulty is mainly due to the fact that conventional photographic copiers are designed for producing copies from documents (generally, single sheets) that lay flat upon the document glass. Textbooks with hard bindings cannot be so oriented.

The crease of a typical textbook generally pyramids upwardly away from the glass, thus causing an upside-down, "V-shaped" surface. This is especially so for thick books with hard covers. The crease, therefore, falls outside of the focal length range for which the copier lens can properly project the image of the book onto the image receiving medium or pre-charged paper. In other words, the crease cannot be focused properly to provide an undistorted image. As a result, the copied crease is often blurred, distorted, and often darkened.

In order to make the copies more legible, the operator of the copier is required to forcibly press upon the backing of the book as it rests upon the glass. Sometimes this will work. However, many times the binding is too stiff, and the crease cannot be projected into the fold. Pressing with excessive force is also risky, as this may cause damage to the binding. In some cases, an immoderate force may even break the glass.

The present invention reflects the discovery that the aforementioned problem can be solved in a user friendly and inexpensive manner.

The current invention comprises a corrective lens that is shaped to fit in the space between the book pages to be copied and the document glass of the copier. This simple solution provides a surprisingly unblurred and undistorted image of the adjacent pages of the book extending into the fold of the crease.

DISCUSSION OF RELATED ART

In U.S. Pat. No. 3,609,030, issued to Meyer L. Sugarman et al. on Sep. 28, 1971, a tabletop electrostatic book copier is illustrated, which has an exposure station on its top. The book to be copied is placed on top of a vertical exposure station and the image of the book is projected directly to the pre-charged paper though a mirror and an optical lens. The image of the book surface is projected using an ordinary optical lens and a mirror found in conventional copiers. The image is projected directly onto a charged paper instead of onto an image receiving medium. There is no teaching or suggestion of using a distorted lens to refocus the page of the document.

In U.S. Pat. No. 4,585,334, issued to Brian R. Malyon on Apr. 29, 1986, a document copier is shown that incorporates a scanner with a forty five degree slanted scanning window glass mounted at the end of a rectangular housing. The ninety degree corner, or the so-called wedge, between the window glass and one of the side walls points downwardly. The book to be copied is placed on a rack below the scanner window glass. The rack is constructed from two flat frames connected together at a ninety degree angle, with its opening facing upward. The book to be copied is faced upwardly and rests on the rack with its inside pages opened at a ninety degree angle. During the copying process, the rack first moves up, bringing the half opened book towards the scanner. It then stops at a predetermined position and keeps a surface of the book page away from the scanner window to prevent causing damage to the book. At this position, the opposite inside page of the book is under the scanner housing, facing the side wall. It may or may not touch that slanted side wall. The scanner then scans the surface of the inside page of the book under its window.

In U.S. Pat. No. 4,763,173, issued to Michael E. Harrigan, et al. on Aug. 9, 1988, a document imaging system is shown including a positive, aspheric, Fresnel lens. The purpose of the system is to compensate for small, smooth wrinkles and curls of the original document to be copied.

SUMMARY OF THE INVENTION

In accordance with the present invention, there is provide a substantially flexible, freely movable, corrective lens that yields undistorted copies of adjacent book pages presented for xerographic copying or for scanning. The corrective lens is substantially rectangular in shape, in order to cover various sizes of books. The lens is placed between the spread pages of the book to be copied and the document glass of the copier. The corrective lens has a mid-portion or center section that extends into the crease of a typical book, where it changes the focal point of the text disposed at the inner edge of the pages. The lens extends outwardly from the center section to form substantially flat side portions, which structurally keep the pages of the open book in place during the copying procedure. This simple lens solution provides a surprisingly undistorted image of the adjacent pages of the book projecting into the fold of the crease, which is then transferred in typical fashion to the copying drum or charged surface of the copying medium or to the photoelectronic sensors of a scanner.

It is an object of this invention to provide an improved means for copying books upon a copying machine substantially free of distortion along a center crease thereof.

It is another object of this invention to provide means for compensating for the distance between the crease of a book and regions proximate thereto, during a photocopying process, that does not require complex structural modifications to conventional copying machines.

It is still a further object of this invention to provide a lens that acts as a wedge to spread the pages of a book closest to the binding thereof.

It is a further object of this invention to provide a freely movable lens for placement between an open book to be copied and the document glass of a copier, wherein the lens changes the focal point of the page edge along the crease.

BRIEF DESCRIPTION OF THE DRAWINGS

A complete understanding of the present invention may be obtained by reference to the accompanying drawings, when considered in conjunction with the subsequent detailed description, in which:

FIG. 2 shows a plan view of typically distorted adjacent pages of the book copied by the copying machine shown in FIG. 1;

FIG. 3 depicts another plan view of typically distorted adjacent pages of the book copied by the copying machine shown in FIG. 1;

FIG. 4 illustrates still another plan view of typically distorted adjacent pages of the book copied by the copying machine shown in FIG. 1;

FIG. 7 illustrates a plan view of typical adjacent pages of a book copied utilizing the corrective lens of this invention, as shown in FIGS. 5 and 6.

DESCRIPTION OF THE PREFERRED EMBODIMENT

Generally speaking, the invention features a corrective lens for copying pages of a book pressed flat upon a document glass of a xerographic copy machine. The corrective lens is shaped to fit in the space between the book pages to be copied and the document support glass of the copier. The corrective lens has a pyramidal center extending into the crease of a typical book. The lens fans out from the pyramidal center to extend to substantially flat side portions.

Figure 1:
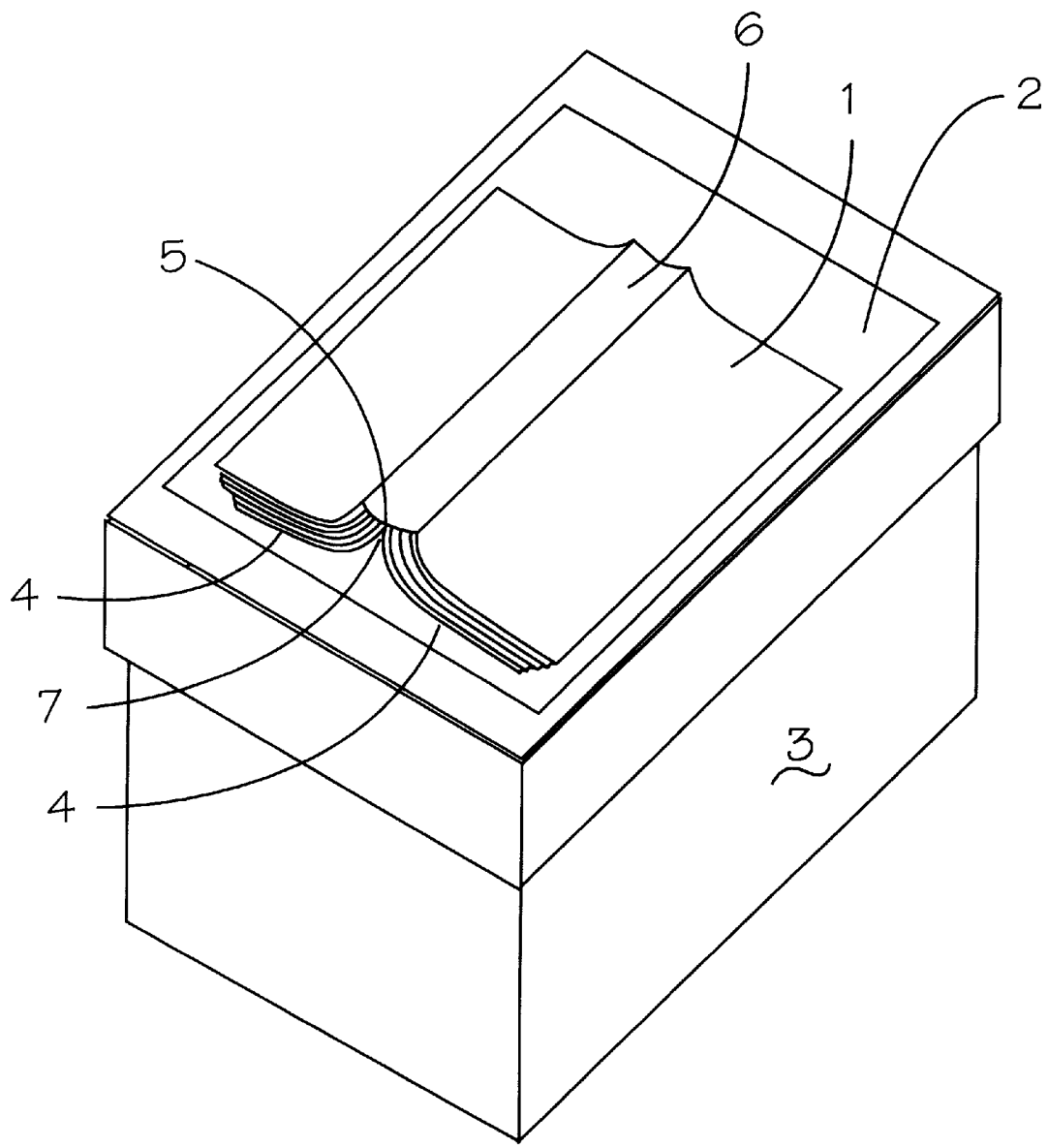
FIG. 1 illustrates a perspective, schematic view of a book that is disposed upon the document glass of a typical xerographic copying machine.

Now referring to FIG. 1, a perspective, schematic view is illustrated of a book 1 that is pressed against the document support glass 2 of a typical xerographic copying machine 3. It will be observed that the binding 6 of the book 1 is relatively stiff, and the crease 5 between book pages or leaves 4 forms a pyramidal void 7 between the book 1 and the glass 2.

The crease of typical textbooks generally pyramids upwardly away from the glass 2, thus causing an upside-down, V-shaped void 7, as shown. The lens of a typical copying machine 3 cannot capture the text or information disposed in the crease 5, resulting in distorted copies, as shown typically in FIGS. 2 through 4.

Figure 2:
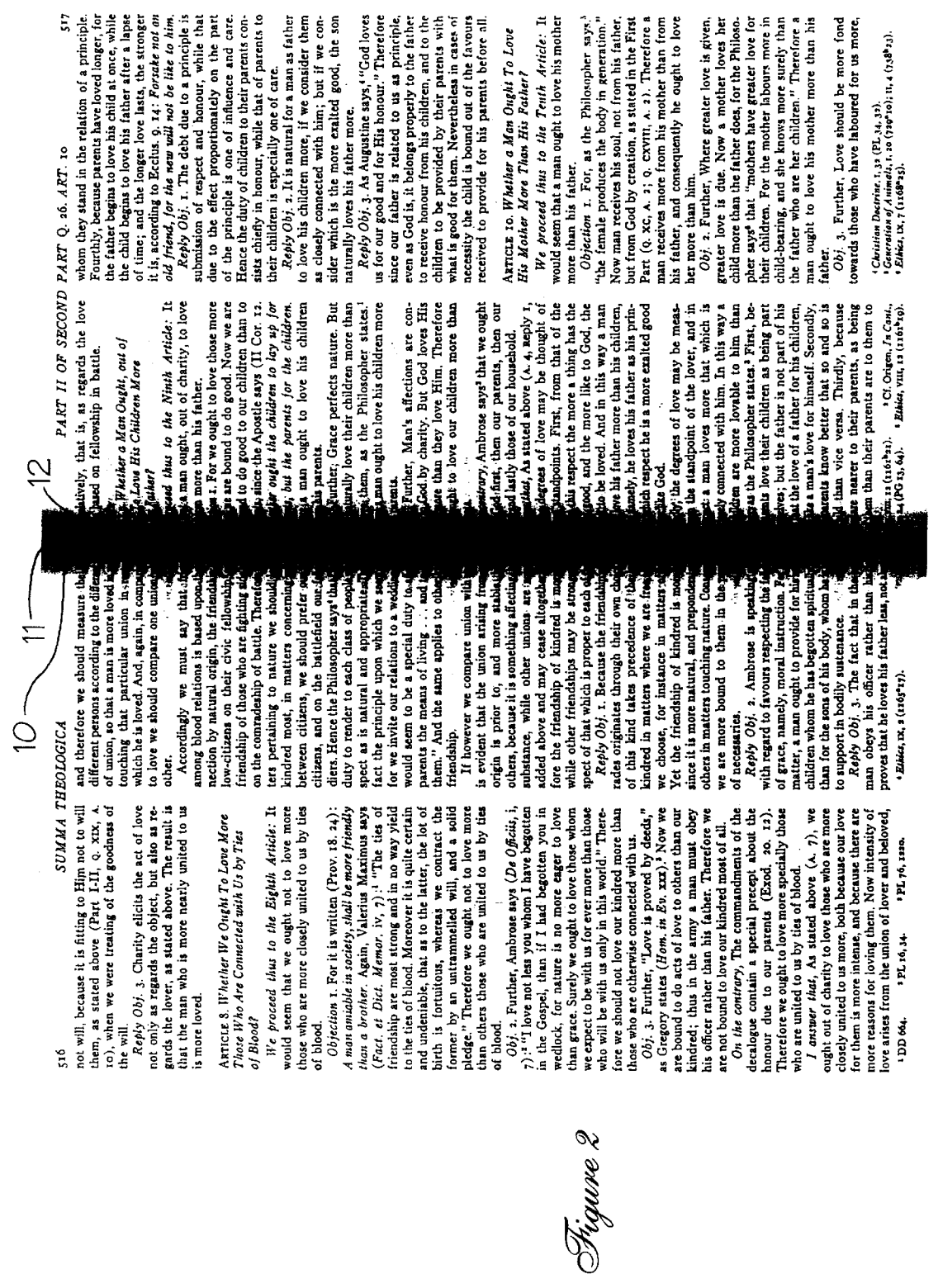
Figure 3:
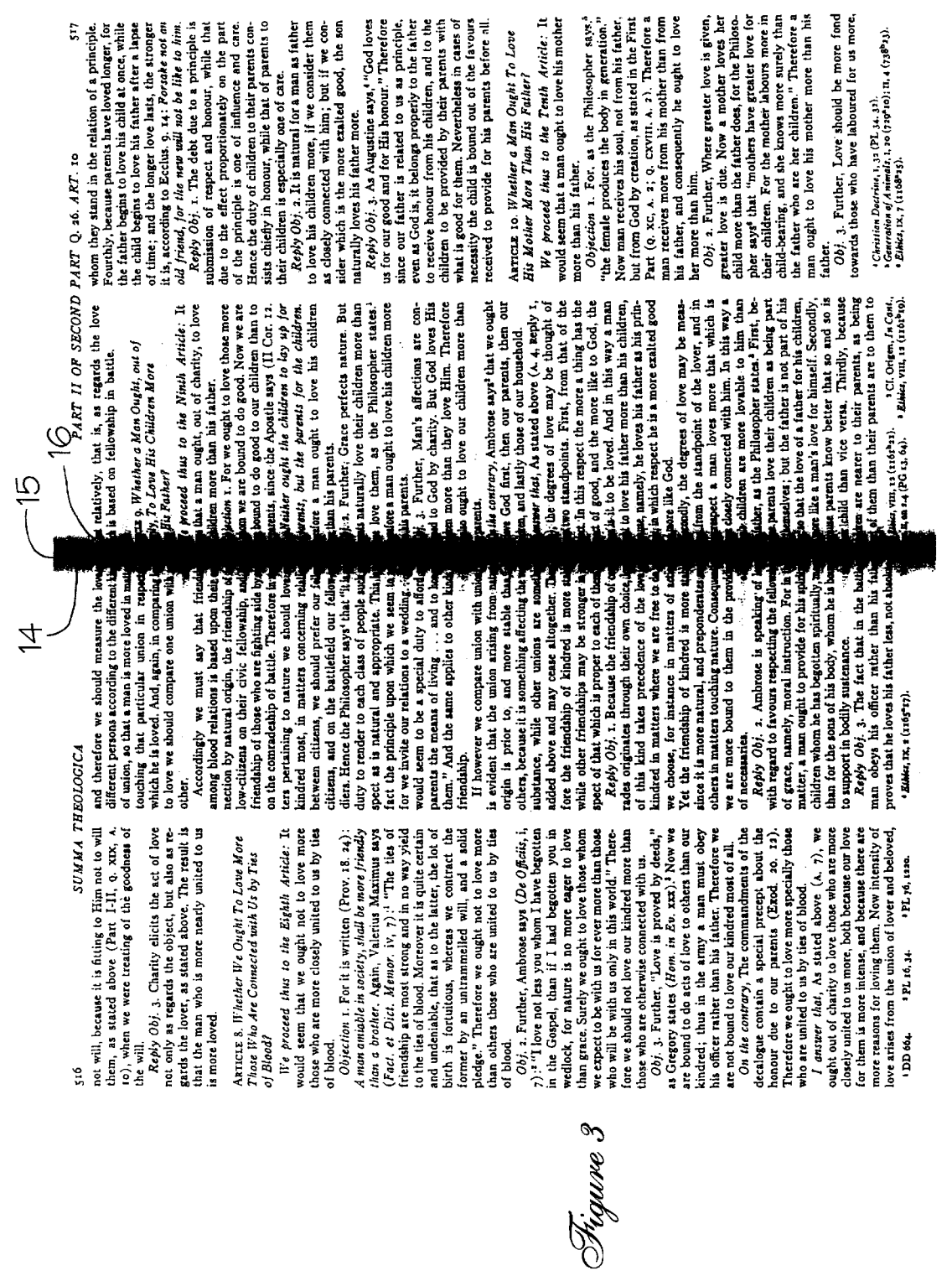

FIG. 2 illustrates that the image of the crease 5 can be distorted with text 12 that runs into a black center line 11. FIG. 3 depicts a typical copy of the book pages, when the binding 6 (FIG. 1) is pressed toward the glass 2. It will be observed that the text 16 disappears into a black center line 15, which appears much narrower than that of the center line 11, shown in FIG. 2.

FIG. 4 depicts a copy of the book 1 after a substantially greater force is applied to the binding 6 than was applied to either of the copies depicted in FIGS. 2 and 3. It will be observed that although the center line 17 is substantially diminished in width and blackness intensity, the text still runs into the center line 17, and is illegible.

Figure 5:
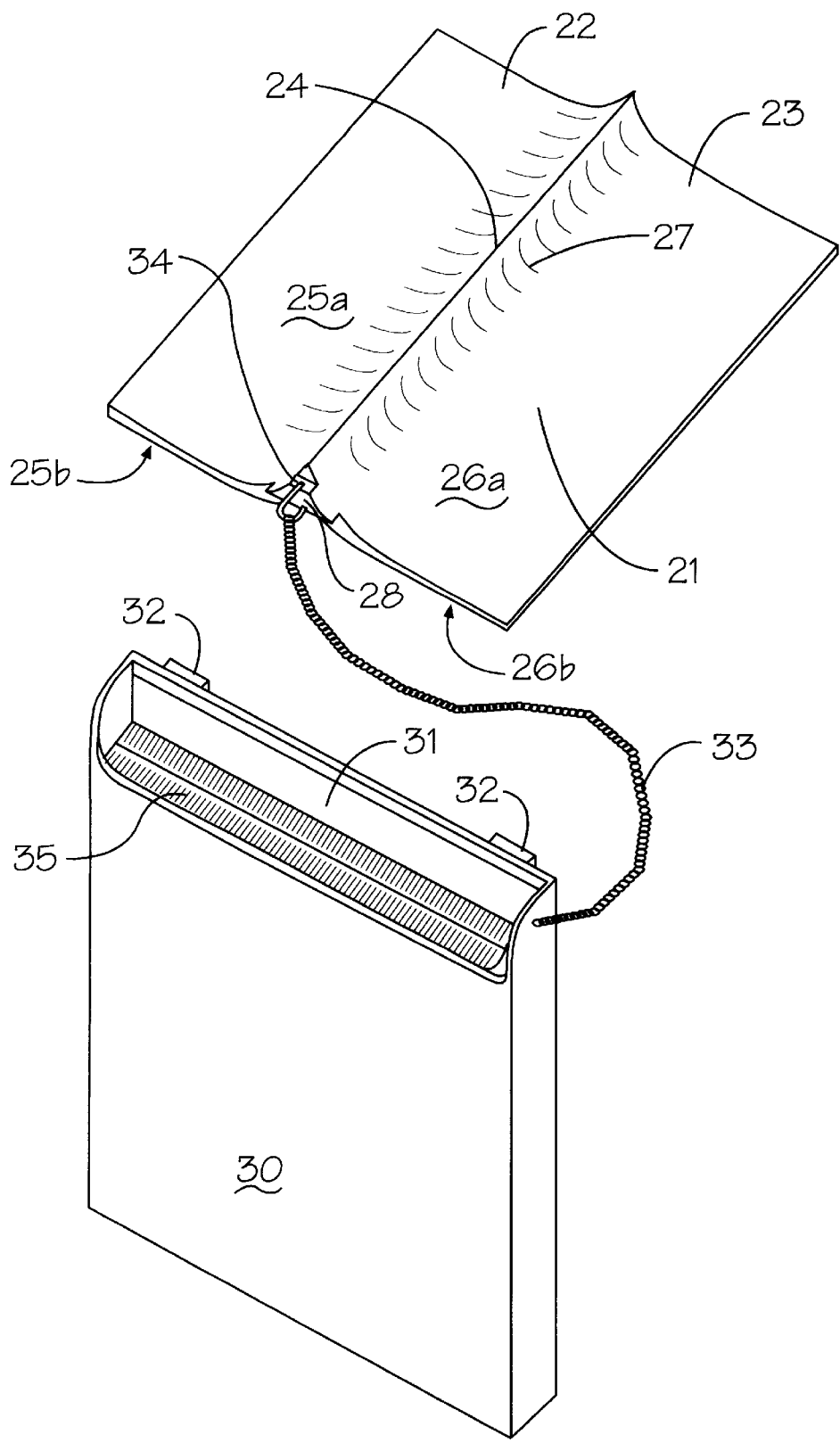
FIG. 5 depicts a perspective view of the corrective lens of this invention, tethered to a holding bin.

Referring to FIG. 5, a corrective lens 21 of this invention is shown. The lens 21 is designed to fit between the book 1 and the document support glass 2. The lens 21 comprises an optically transparent material, such as lucite. The upper surface 25a and 26a of lens 21, as well as the lower surface 25b and 26b of lens 21, can be coated with a thin, protective, non-abrasive material, such as Teflon, in order to enhance its resistance to scratching or scoring. The leaves 22 and 23 of lens 21 have a constant cross sectional shape along its full length, until the center portion 27 is reached. The center portion 27 is distorted to a nearly triangular shape, to enable it to fit snugly inside the crease 5 of the open book 1 as it lays flat upon glass 2, as illustrated in FIG. 1.

The lens 21 has a variable focal length to compensate the variation of distance between the flat document support glass 2 and the leaf surfaces 4 of the book 1. As leaves 22 and 23 of the lens 21 approach the crease 5, the lens portion 27 thickens towards the center 24, which peaks in pyramidal fashion.

The contour of respective top surfaces 25a and 26a resembles the surface contour of the inside pages of opened book 1. Therefore, when an opened book is placed on top of lens 21, the inside page surfaces 4 to be copied can rest upon, and make intimate contact with, the top surfaces 25a and 26a of the lens 21.

In operation, the wedge shaped ridge 24 is pressed into the pyramidal void 7 between the adjacent pages 4, the force of such procedure allowing the wedge shaped ridge 24 to spread the pages 4 of the book 1, so that the contour thereof matches the curvature of the ridge 24. Thus, this area is opened for the copier to properly scan the text of both pages 4, without obstruction.

The slope of the bottom surface 25b and 26b of lens 21 is not necessarily similar to that of the corresponding top surface 25a and 26a. Although the shapes of the top and bottom surfaces are similar, their curvatures are different so that the lens 21 can properly compensate the image of the book surfaces 4.

A lens 21 with symmetrical left-hand and right-hand halves is most suitable for helping to make clear copies of most inside pages of a book. However, for making copies of the first several or last few pages of a book, a non-symmetrical lens fits better to the non-symmetrical contour of the inside pages. Furthermore, the curvatures of the sloped portion of the inside pages 4 of a thick book are quite different from the curvatures of a thin book. Therefore, the lens 21 can be varied to accommodate different top surface contours. Accordingly, in the actual application, a general purpose design may be suitable for most applications. However, in order to strictly meet the requirement for many different book sizes, a set of several lenses 21 with varying surface contours and magnifications may be needed.

In order to provide a convenient storage for the lens(es), a storage bin 30 may be fastened on one of the side walls of the copier 3, or placed between the table and the bottom of a table top copier. The inside 31 of the storage bin 30 may be covered with a thin and soft lining material to prevent the optical lens 21 from becoming scratched or scored, while inserting or removing it. The bin surface 31 can comprise plastic materials that resist static electrical charge. A pair of brushes 35 can also be installed near the opening of the storage bin 30. The brushes 35 remove dust and particles from the lens 21 when it is inserted or removed from the bin 30.

The bin is attached to the copier 3 by two spacers 32 that allow air to circulate between the copier 3 and bin 30. In order to prevent the lens 21 from becoming misplaced or removed from the copy area, the lens 21 is attached to the bin 30 by a tether 33.

The glass 2 of many copiers is not at the same level with their frames. Therefore, in order to keep the bottom surface of the lens 21 intimately contacted with the glass 2, the portion attached to tether 33 can be placed on top of the glass 2. Thus, it may show up in the copies being made. Otherwise, the lens 21 must be lifted away from the glass 2. Doing this may change the predetermined position of the book or book image. Therefore, a portion 28 of the lens 21 below the tether 33 at attachment point 34 is removed. Thus, the lens can be positioned outside of the glass 2 without the need to adjust the lens 21 or copier lid.

Figure 6:
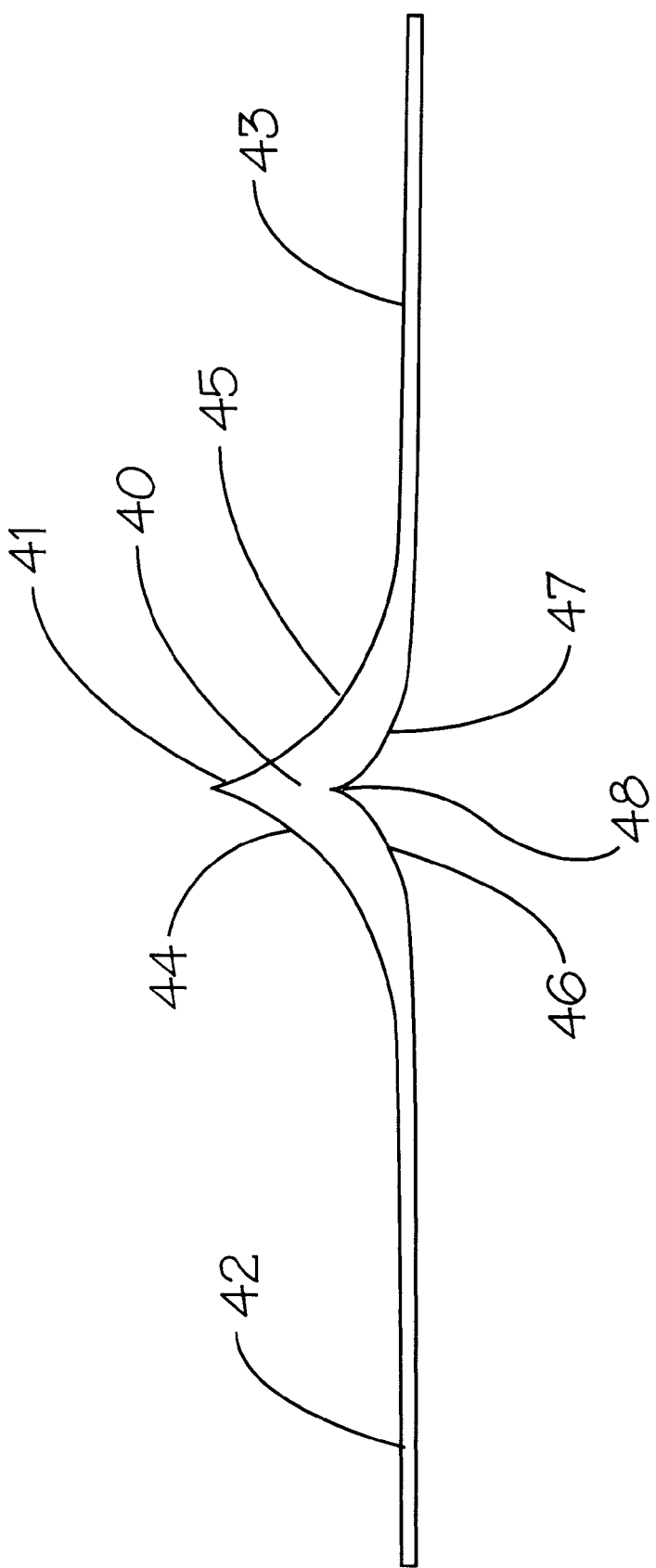
FIG. 6 shows a sectional, side view of the corrective lens depicted in FIG. 5.

Referring to FIG. 6, a cross sectional view of lens 21 is shown. The lens 21 is actually constructed of three parts: the thick portion or the lens 40 in the center, and two thin, flat, leaf portions 42 and 43, respectively. The lens is specially designed to bring the image of the book closer to the glass 2, enlarging and stretching the compressed portion of the book image into its original size and form, as befits the sloped area of the crease 5. The leaves 42 and 43 are extensions of the lens 21. They are large and substantially constant in thickness. The main purposes of the leaves 42 and 43 are to eliminate the glitches in copies caused by the edges of the lens, and to allow for ease in handling the opened book upon the glass 2.

The top surfaces 44 and 45 of the lens portion 40 of lens 21 is composed of two sections of approximately inverse cylindrical shaped surfaces. The radii of these inverse cylindrical surfaces can range from 0.5 to 1.75 inches depending on their thickness and the type of books to be copied. In practice, lenses 21 with top surfaces composed of inverse cylindrical surfaces with radii of approximately 0.93 inch were found suitable for hardcover books with thicknesses up to 2.5 inches. For thicker books, or books printed using stiff paper, top surfaces may be used that are composed of inverse cylindrical surfaces with larger radii.

In addition, for copying the first or last few pages of a book, lenses with non-symmetrical top surfaces may be used to better fit the non-symmetrical contour of the book crease 5. The two inverse cylindrical top surfaces of the lens 21 connect at ridge 41 at a sharp angle. The exact contour of the bottom surfaces 46 and 47 can be determined based on theories on optical image projection. However, there are other considerations, such as the aforementioned black strip 10 of FIG. 2, and image compression. Therefore, in practice, the exact shape or contour of the bottom surfaces 46 and 47 must be empirically determined. The empirically determined bottom surfaces 46 and 47 of the lens are shaped similarly to the top surfaces 44 and 45.

The bottom surface 46 and 47 of the lens is also approximately cylindrical shaped with radii ranging from 0.15 to 1.2 inches, depending on the curvature of the top surface 44 and 45 and the optical properties of the lens material. For a lens made of acrylic material and with its top surfaces formed by two 0.93 inch radii inverse cylindrical surfaces, bottom cylindrical surfaces with radii of 0.335 inch were found very satisfactory.

In tests using different coping machines 3 and lenses 21, it was found that no black or gray stripe 10 (FIG. 2) appeared in the copies. The copy brightness scale was set one scale brighter than normal, since the magnification about area 40 tends to diminish the light being reflected to the drum.

The lens 21 improves the quality of the copies produced from the inside pages of a book in four ways simultaneously:

1) It works as an optical lens to project an image of the book surface closer to the copier's document support glass than the actual surfaces of the book pages. Thus, it helps the copier lens to focus better and produce a crisp image of the book surface near its binding.

2) It optically stretches or decompresses the book image near its binding. As a result, the images of characters or pictures in this area are stretched back to their original shapes printed on the inside pages of the book.

3) The ridge 24 helps to open up the book near the binding; thus, the images of the characters and pictures in this area can be more clearly scanned by the copier.

4) The top surfaces of the lens work as a guide to help the inside pages slide outward easily and smoothly, without being squeezed toward each other.

Referring to FIG. 7, a plan view of the adjacent pages of a copied book is shown. It will be observed that the text 51 is clear, and has not been cut-off, as shown in the prior copies of FIGS. 2 through 4. It will also be seen that the center line 50 is now a normal demarcation line. The beneficial effect shown in FIG. 7 is due to pressure being applied against the crease of the book by the lens.

Figure 8:
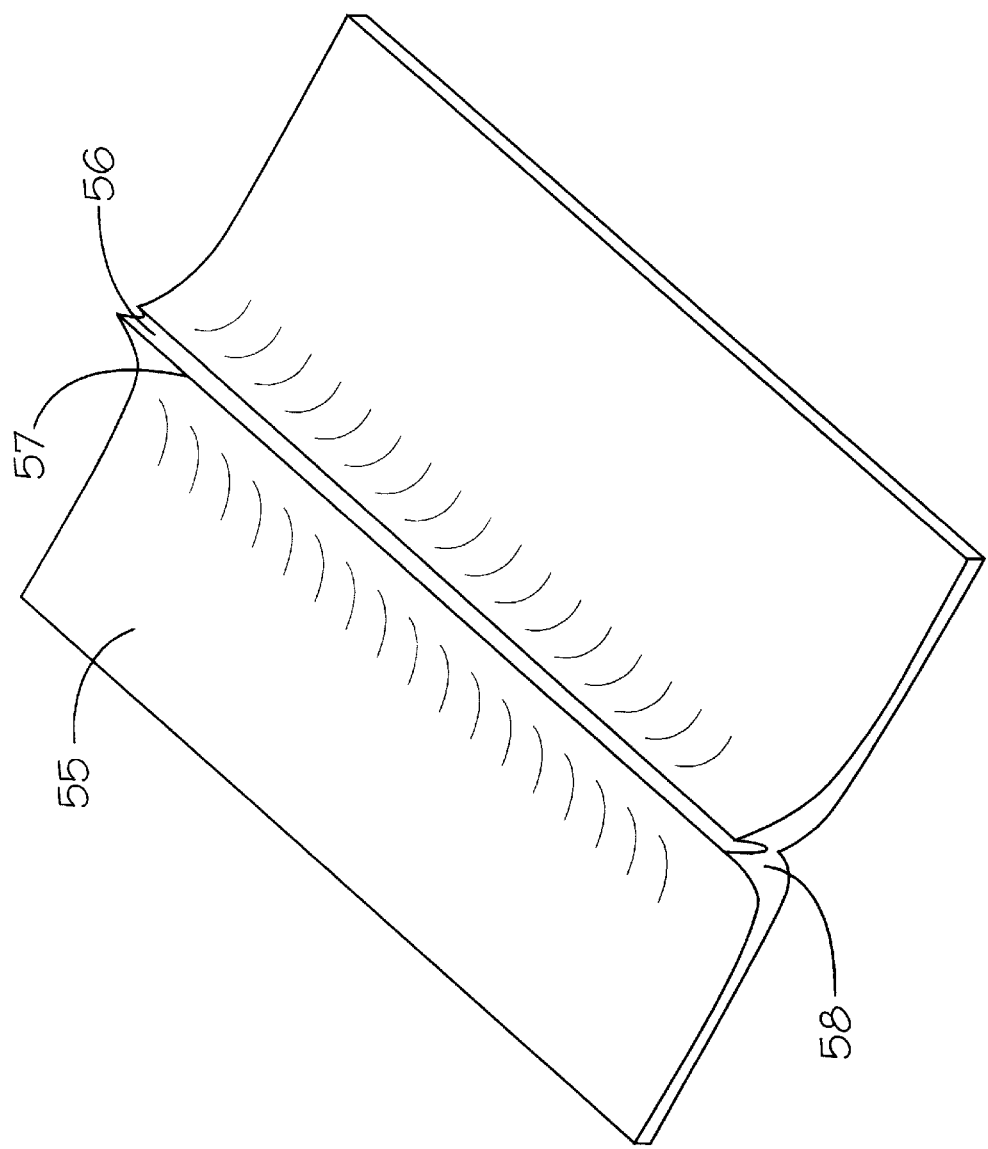
FIG. 8 depicts a schematic, perspective view of an alternate embodiment of the corrective lens illustrated in FIG. 5.

Referring to FIG. 8, an alternate embodiment 55 of the lens 21 is shown. The lens 55 is made of a flexible and transparent material. It has a groove 56 disposed along a lengthwise axis, on the top side of ridge 57. The groove 56 makes the lens 55 more flexible in bending.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A corrective, one-piece, rigid or semi-rigid lens that yields substantially undistorted copies of adjacent open book pages presented for xerographic copying or document scanning upon a document support glass of a copier or scanner, comprising:

a substantially transparent element for placement within various sizes of open books, said transparent element having a mid-portion that fits within, and contours to, a crease of the open book adjacent a binding thereof, said mid-portion of said transparent element having focal length changing means for changing a focal point of an edge of each adjacent page along said crease, in order to present a substantially non-blurred and undistorted image of said edge of each adjacent page of said open book as it lies upon a document support glass of said copier; and integral extension arms extending outwardly from said mid-portion to cover a remainder of the open book and hold said pages in place, said substantially transparent element being rigid or semi-rigid, whereby an open book can be pushed downwardly upon said transparent element without deforming same, prior to copying pages thereof.

2. The corrective lens in accordance with claim 1, wherein said extension arms are substantially flat, thereby covering a page surface of said open book.

3. The corrective lens in accordance with claim 1, wherein said extension arms are substantially devoid of focal length changing means.

4. The corrective lens in accordance with claim 1, wherein said extension arms are each substantially rectangular.

5. The corrective lens in accordance with claim 1, wherein said focal length changing means comprises a curvilinear surface.

6. The corrective lens in accordance with claim 1, wherein said focal length changing means comprises a portion of a cylindrical surface.

7. The corrective lens in accordance with claim 1, wherein said focal length changing means comprises a portion of an elliptical surface.

8. The corrective lens in accordance with claim 1, wherein said extension arms are substantially thinner than said mid-portion.

9. The corrective lens in accordance with claim 1, wherein said mid-portion comprises means defining a groove extending along a lengthwise axis thereof.

10. The corrective lens in accordance with claim 1, wherein said mid-portion and said extension arms are coated with a non-abrasive material.

11. A combination of corrective lens for a book copying apparatus, and a protective bin for storing said corrective lens, said corrective lens being tethered to said bin and said bin being secured to said book copying apparatus.

12. The combination of corrective lens for a book copying apparatus, and a protective bin for storing said corrective lens in accordance with claim 11, wherein said bin has non-abrasive surfaces for housing said corrective lens.

13. A portable, freely disposable, corrective, one-piece, rigid or semi-rigid lens that yields substantially undistorted copies of adjacent open book pages presented for xerographic copying or document scanning upon a document support glass of a copier or scanner, comprising:

a substantially transparent, movable, lens element for placement over various sizes of open books, said transparent element having a mid-portion that fits within, and, when pressed against the open book, contours to, a crease thereof adjacent a binding thereof, said mid-portion of said transparent element having focal length changing means for changing a focal point of an edge of each adjacent page along said crease, in order to present a substantially non-blurred and undistorted image of said edge of each adjacent page of said open book as it lies upon a document support glass of said copier; and integral extension arms extending outwardly from said mid-portion to cover a remainder of the open book and hold said pages in place, said substantially transparent, movable, lens element being rigid or semi-rigid, whereby an open book can be pushed downwardly upon said transparent element without deforming same, prior to copying pages thereof.

14. The corrective lens in accordance with claim 13, wherein said extension arms are substantially flat, thereby covering a page surface of said open book.

15. The corrective lens in accordance with claim 13, wherein said extension arms are substantially devoid of focal length changing means.

16. The corrective lens in accordance with claim 13, wherein said extension arms are each substantially rectangular.

17. The corrective lens in accordance with claim 13, wherein said focal length changing means comprises a curvilinear surface.

18. The corrective lens in accordance with claim 13, wherein said focal length changing means comprises a portion of a cylindrical surface.

19. The corrective lens in accordance with claim 13, wherein said focal length changing means comprises a portion of an elliptical surface.

20. The corrective lens in accordance with claim 13, wherein said extension arms are substantially thinner than said mid-portion.

21. The corrective lens in accordance with claim 13, wherein said mid-portion comprises means defining a groove extending along a lengthwise axis thereof.

22. The corrective lens in accordance with claim 13, wherein said mid-portion and said extension arms are coated with a non-abrasive material.

23. A corrective, one-piece, rigid or semi-rigid lens that yields substantially undistorted copies of adjacent open book pages presented for xerographic copying or document scanning upon a document support glass of a copier or scanner, comprising:

a substantially transparent element for placement within various sizes of open books, said transparent element having a substantially rigid mid-portion that fits within, and contours to, a crease of the open book adjacent a binding thereof, said mid-portion of said transparent element having a focal length which is different from one location of the lens to another location thereof in order to accommodate the height of the adjacent book pages above the document support glass of a copier, such book page height varying from one location to another across said crease, in order to present a substantially non-blurred and undistorted image of said edge of each adjacent page of said open book as it lies upon said document support glass of said copier; and thin and non-brittle integral extension arms extending outwardly from said mid-portion to cover a remainder of said open book and hold said pages in place, said substantially transparent element being rigid or semi-rigid, whereby an open book can be pushed downwardly upon said transparent element prior to copying pages thereof without substantially changing the shape or focal length of said transparent element.

24. The corrective lens in accordance with claim 23, wherein said extension arms are substantially thinner and more flexible than said mid-portion to prevent said extension arms from becoming cracked or broken while in use.

25. A portable, freely disposable, corrective, one-piece, rigid or semi-rigid lens that yields substantially undistorted copies of adjacent open book pages presented for xerographic copying or document scanning upon a document support glass of a copier or scanner, comprising:

a substantially transparent, movable, lens element for placement over various sizes of open books, said transparent element having a substantially rigid mid-portion that fits within and, when pressed against the open book, contours to, a crease thereof adjacent a binding thereof, said mid-portion of said transparent element having a focal length that is different from one location of the lens to another location thereof in order to accommodate the height of the adjacent book pages above a document support glass of a copier that is different from one location to another across said crease, in order to present a substantially non-blurred and undistorted image of said edge of each adjacent page of said open book as it lies upon said document support glass of said copier; and thin and non-brittle integral extension arms extending outwardly from said mid-portion to cover a remainder of the open book and hold said pages in place, said substantially transparent, movable, lens element being rigid or semi-rigid, whereby an open book can be pushed downwardly upon said transparent element prior to copying pages thereof without substantially changing the shape or focal length of said transparent element.

26. The corrective lens in accordance with claim 25, wherein said extension arms are substantially thinner and more flexible than said mid-portion to prevent said extension arms from being cracked or damaged while in use.

* * * * *